SIMONTON & WICKS.
Straw Cutter.
No. 12,699.
Patented April 10, 1855.
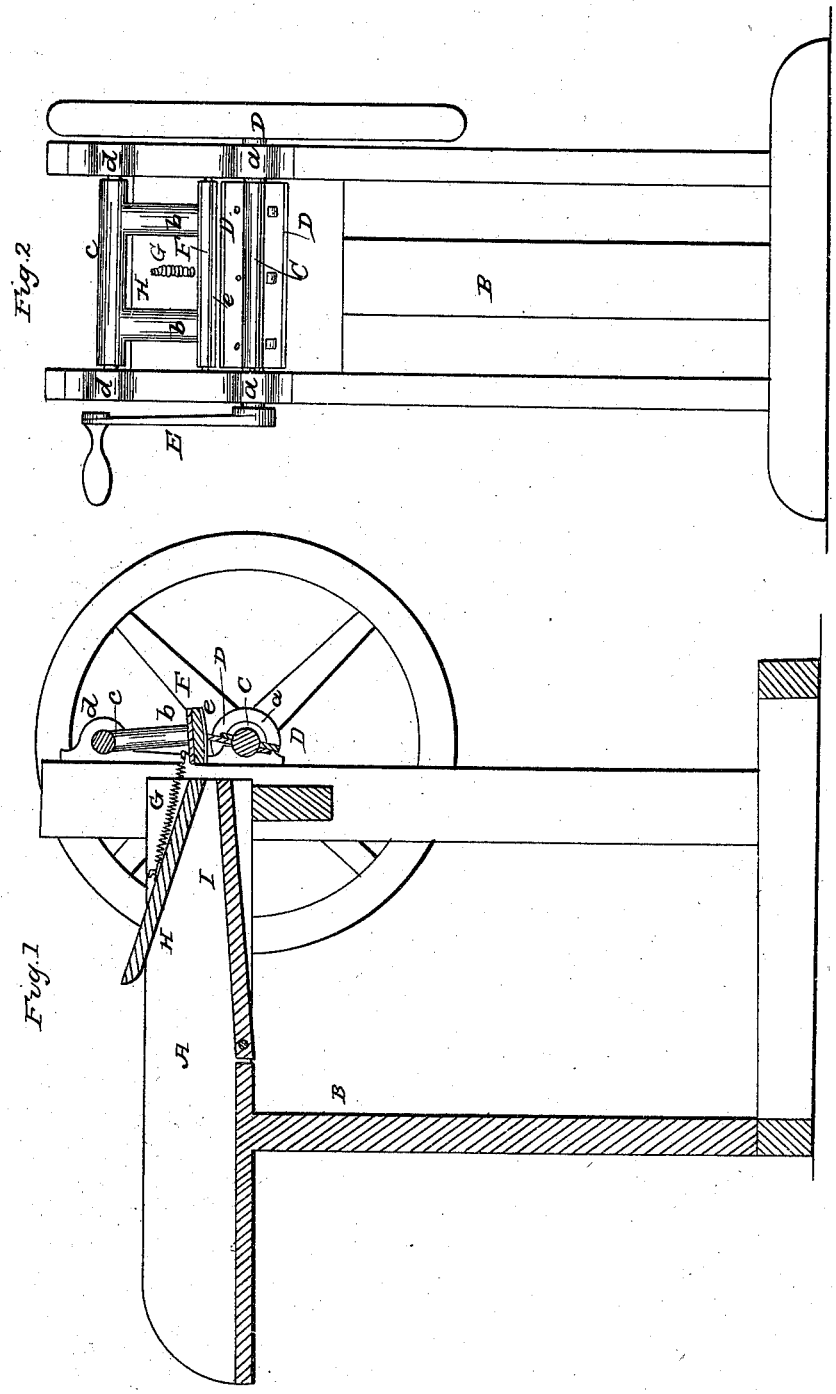

UNITED STATES PATENT OFFICE.

THOS. C. SIMONTON AND LOREN J. WICKS, OF PATERSON, NEW JERSEY.

STRAW-CUTTER.

Specification of Letters Patent No. 12,699, dated April 10, 1855.

*To all whom it may concern:*

Be it known that we, THOMAS C. SIMONTON and LOREN J. WICKS, of Paterson, in the county of Passaic and State of New Jersey, have invented a new and Improved Straw-Cutter; and we do hereby declare that the following is a full, clear, and exact description of the same, reference being had to the annexed drawings, making a part of this specification, in which—

Figure 1, is a longitudinal vertical section of our improved straw cutter, the plane of section passing through the center. Fig. 2, is a front view of ditto.

Similar letters of reference indicate corresponding parts in the two figures.

This invention relates to a new and improved straw cutter and consists in the employment or use of a cylinder having knives upon its periphery and operating in connection with a vibrating bed as will be hereafter shown and described.

To enable others skilled in the art to fully understand and construct our invention, we will proceed to describe it.

A, represents the feed box of the machine of the usual form and supported in the usual manner by a frame work B.

At the front end of the frame B, and about in line with the bottom of the feed box there is a cylinder C, having two knives D, D, attached to it, said knives extending the whole length of the cylinder and parallel with it. The knives are attached to the cylinder at opposite points on its periphery.

The axis of the cylinder runs in suitable bearings (a) (a) attached to the frame B, the ends of the axis extending a short distance beyond the bearings, one end having a fly wheel D, upon it and the opposite end a crank E.

Directly above the cylinder C, there is a bed F, which has two uprights or arms (b) (b) attached to its upper surface. The upper ends of these uprights or arms are connected with a shaft (c) which works in bearings (d) (d) attached to the frame B. The under surface of the bed F, is slightly convex and just touches the edges of the knives D, D, when in a vertical position.

G, is a spiral spring one end of which is secured to the inner side of the bed F, and the opposite end to a guide board H, at the front end of the feed box A.

The under surface of the bed F, is provided with a layer of raw hide (e) or other suitable material in order to prevent the edges of the knives from being injured by coming in contact with the bed.

I, Fig. 1, is an adjustable throat piece, the inner end being secured to the sides of the feed box by pivots so as to allow the outer end to be raised or lowered to govern the length of the cut.

The operation will be readily seen. The straw to be cut is placed in the feed box A, and a rotary motion is given the cylinder C, by turning the crank E, and the knives D, D, as they rotate cut the straw which passes between their edges and the under surface of the bed F, which vibrates or moves forward by the pressure of the knives as they bear against it while cutting through the straw, the bed returning backward as the knives pass it by the action of the spiral spring G. The knives and bed by their operation giving the proper feed motion to the straw. The feed motion may be modified however so that the straw may be cut longer or shorter by adjusting the throat piece I, and therefore enlarging or contracting the orifice or mouth of the feed box through which the straw passes, so that the straw cannot pass too freely through the orifice or mouth.

We do not claim the adjustable throat piece I, for that has been previously used, neither do we claim separately the cylinder C, with knives D, D, thereon for they also have been used, but What we do claim as new and desire to secure by Letters Patent, is—

The combination of the cylinder C, with the knives D, D, attached to its periphery, and vibrating bed F, constructed, arranged and operating in the manner and for the purpose as herein shown and described.

THOS. C. SIMONTON.
LOREN J. WICKS.

Witnesses:
ANDW. MEAD,
PETER D. SIMONTON.